(12) United States Patent
Zins

(10) Patent No.: US 7,228,787 B2
(45) Date of Patent: Jun. 12, 2007

(54) METHOD FOR JOINING THE FUNCTIONAL PARTS OF HYDRAULIC OR PNEUMATIC WORKING DEVICES, AND JOINING CONNECTION

(75) Inventor: Guy Zins, Falck (FR)

(73) Assignee: DBT GmbH, Lunen (DE)

( * ) Notice: Subject to any disclaimer, the term of this patent is extended or adjusted under 35 U.S.C. 154(b) by 262 days.

(21) Appl. No.: 10/524,567

(22) PCT Filed: Aug. 23, 2003

(86) PCT No.: PCT/EP03/09361

§ 371 (c)(1),
(2), (4) Date: Feb. 11, 2005

(87) PCT Pub. No.: WO2004/022917

PCT Pub. Date: Mar. 18, 2004

(65) Prior Publication Data

US 2005/0271481 A1    Dec. 8, 2005

(30) Foreign Application Priority Data

Sep. 6, 2002  (DE) ................................ 102 41 801

(51) Int. Cl.
*E21D 15/00*  (2006.01)
(52) U.S. Cl. ........................ 92/168; 405/290; 277/435; 403/269
(58) Field of Classification Search ................ 277/435, 277/437, 572, 575, 922; 92/168, 248; 403/268, 403/269, 270, 292, 293, 298; 405/290
See application file for complete search history.

(56) References Cited

U.S. PATENT DOCUMENTS

| 3,638,978 | A | * | 2/1972 | Guntermann | ................ 403/268 |
| 4,127,741 | A | * | 11/1978 | Bauer et al. | ................. 403/268 |
| 4,752,151 | A | * | 6/1988 | Ashida et al. | ............... 403/267 |
| 5,037,234 | A | * | 8/1991 | De Jong | ...................... 403/268 |
| 5,606,839 | A | * | 3/1997 | Baumann | .................... 52/726.1 |
| 6,200,061 | B1 | * | 3/2001 | Goto | .......................... 403/268 |

FOREIGN PATENT DOCUMENTS

| DE | 1207317 | 12/1965 |
| DE | 4323462 C2 | 5/1995 |
| DE | 198 18 475 A | 11/1999 |
| DE | 10045680 B4 | 4/2002 |
| FR | 2 072 357 A | 9/1971 |
| FR | 2072357 | 9/1971 |
| FR | 2 118 637 A | 7/1972 |
| GB | 1 541 252 A | 2/1979 |
| GB | 2 078 858 | * 1/1982 ................. 405/290 |
| RU | 2044675 C1 | 7/1995 |

OTHER PUBLICATIONS

IPER, Dec. 17, 2004 (English language).
P.I. Orlov, Russian Handbook, p. 243,1988.
V. G. Mikulsky, Russian Handbook, pp. 196-197, 1975.

* cited by examiner

Primary Examiner—Sunil Singh
Assistant Examiner—Michael P. Ferguson
(74) Attorney, Agent, or Firm—Fay Sharpe LLP

(57) ABSTRACT

Joining connections are presented for joining the functional parts of hydraulic or pneumatic operating devices the joining connections including a first part exhibiting an external wall section and a second part exhibiting an internal wall section, which are joined together with mutually overlapping wall sections having depressions that form a cavity, in the connected state that is filled with a fluid casting compound of plastic that connects the two parts together by means of a positive form fit after hardening to prevent relative displacements between the two functional parts and to seal the separating gap clearance between the wall sections of the two functional parts.

15 Claims, 4 Drawing Sheets

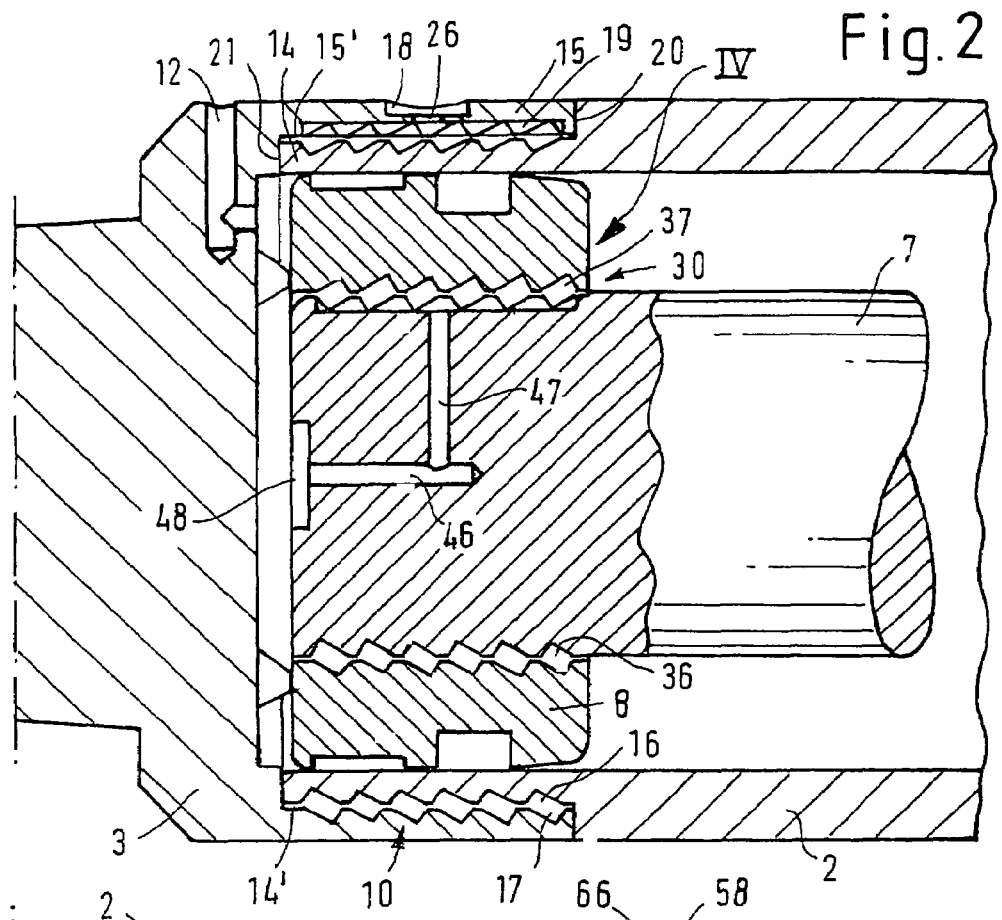
Fig.2
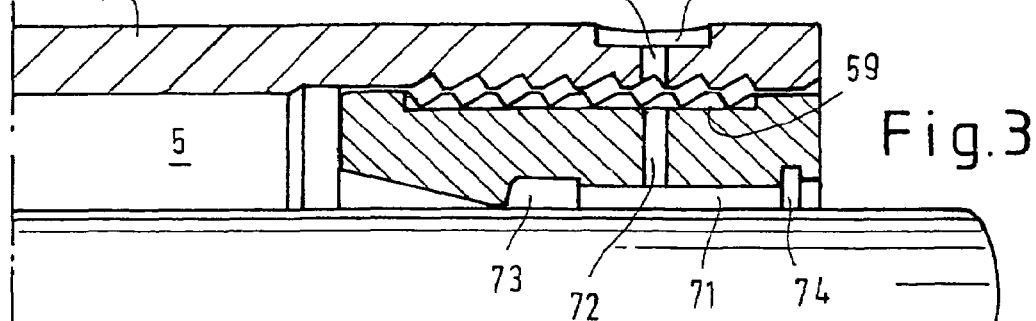
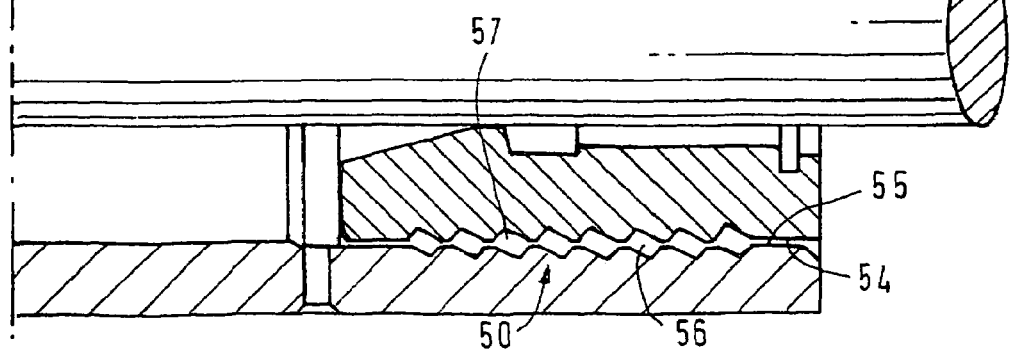
Fig.3

METHOD FOR JOINING THE FUNCTIONAL PARTS OF HYDRAULIC OR PNEUMATIC WORKING DEVICES, AND JOINING CONNECTION

CROSS-REFERENCE TO RELATED APPLICATIONS

This application is a national stage entry of international application number PCT/EP2003/009361, having international filing date Aug. 23, 2003, which was not published in English, which claims priority to German patent application number DE10241801, filed Sep. 6, 2002.

BACKGROUND OF THE INVENTION

The invention relates to a method for joining the functional parts of hydraulic or pneumatic working devices, in particular of operating rams such as props for underground mining, with a first part having an external wall section and a second part having an internal wall section, which parts are joined together with mutually overlapping wall sections are connected to each other in said overlapping sections. The invention also relates to a joining connection for the corresponding functional parts, which include a first part with an external wall section and a second part with an internal wall section, which parts can be joined together and connected to each other with mutually overlapping wall sections.

BACKGROUND OF THE INVENTION

In particular in underground mining a large number of hydraulically actuated roof props or shield support props are required, in order to hold open the underground spaces such as a longwall face or roadway as produced in mining. Furthermore hydraulic operating rams also come into use in the advancing movement of extraction equipment and similar. The shield support props or roof props can be configured as single operating rams or as telescopic multiple operating rams, while the hydraulic rams providing advancing movement are mostly configured as double-acting hydraulic operating rams, which can be actuated by the stroke force in the outward stroke and inward stroke directions. Here each operating ram includes at least one cavity in the interior of a cylinder, and also a piston with piston rod as an axially moving body, each comprising or consisting of at least two parts, which must be connected together so as to be sealed against fluid leakage, and in the connected joint state must be able to withstand high hydraulic pressures of several hundred bar.

Telescopic roof props are known for example from DE-AS 1 2 07 317, DE 100 45 680 A1 or DE 43 23 462. Each ram stage includes a cylindrical tube as a first functional part and a cylinder head cover as a second functional part which are connected together in a sealed manner by means of snap rings, welded connections or screwed connections. Welding offers the advantage that no leakages occur at the connection junctions. The disadvantage with welding is, however, that the structure of the tubes used for the cylinders and the structure of the cylinder head cover, collar rings or base plates can be impaired or destroyed by the process of welding. To be able to use cold-drawn tubes for the cylinders, it was therefore recommended in DE 43 23 462 C2 that the wall sections of the cylinders be secured with the corresponding base plates or cylinder head covers by means of shear wires that are inserted into a connecting groove. Other joining connections between the functional parts of hydraulic or pneumatic operating devices consist of matching threads, pins, collets and similar. The sealing of the separating gap or separation gap between the parts connected together is achieved by means of static seals.

BRIEF SUMMARY OF THE INVENTION

The object of the invention is to propose a method for joining the functional parts of hydraulic or pneumatic operating devices and a joining connection for these functional parts, which enables short assembly times between the functional parts, does not negatively affect the structure of the materials used for the functional parts, and at the same time also enables sealing of the joint gap between the functional parts.

These and other tasks are solved by the invention of a method and a joining connection.

The method in accordance with the invention is characterised by the steps of arranging the parts with mutually overlapping wall sections with the formation of a cavity by means of depressions provided in both wall sections, and filling the cavity with a casting compound of plastic which is fluid in a heated or plasticised state, and which in the hardened or solidified state connects the two parts together by means of a positive form fit. The plastic that is introduced into the cavity between the wall sections of the functional parts prevents, as soon as it is hardened or solidified, relative movements caused by positive form fit between the functional parts, since it penetrates into the depressions provided in both wall sections, completely fills these and in the cavity solidifies to a quasi rigid body of stable shape. The plasticisation temperatures for the plastic casting compounds lie, at approximately 300° C., significantly lower than the melting temperatures of metals, so that no negative effect on the structure of the functional parts made of metals can occur. Particularly advantageously is that the functional parts, in particular the cylinders, can consist of cold-drawn tubes, and that all functional parts can be e.g. coated before the manufacture of the joining connection. Also the risk of distortion of the functional parts made of metal, as can occur when connecting the parts with a welded joint, does not exist. At the same time it is advantageous that manufacturing inaccuracies on the mutually overlapping wall sections can be almost completely eliminated by the cast-in plastic, taking account of the tendency of the plastic material to shrink by approximately 0.2% to 1%.

In a preferred embodiment of the method the casting compound is introduced as an injection casting compound, which in particular can be injected into the cavity at high pressure. The pressure during injection can, for example, be 200 bar, in order to fill the total cavity completely and in a short period of time, despite comparatively long flow paths. Preferably before the filling or injection of the casting compound at least the wall sections of the functional parts forming the region of mutual overlap are pre-heated, e.g. by inductive heating. Furthermore it is advantageous that for certain functional parts a guide sleeve or similar for an axially moving body such as the piston shaft or an internal cylinder can be formed at the same time as the positive form fit connection on the inner surface of one of the functional parts, or, for the part itself, on its outer surface, and/or also a sealing system can be formed for the guide sleeve. In the assembly and joining of the functional parts an additional assembly step for guide strips for the axially moving part, such as, in particular, the piston rod or the internal cylinder of one stage of a multistage operating ram, can then be dispensed with.

The joining connection in accordance with the invention is characterised in that both wall sections comprise a depression, which in the connected state form a cavity that is filled with fluid casting compound of plastic, which after it is hardened or solidified connects the two parts together by means of a positive form fit. For the joining connection in accordance with the invention the depressions in the functional parts, preferably made of metal, are filled by the casting compound solidified to a secure locking body; the locking body, penetrating into the depressions to provide a positive form fit, prevents relative displacements between the two functional parts. At the same time the casting compound hardened in the cavity undertakes the sealing of the separating gap between the wall sections of the two functional parts, so that sealing media such as Loctite, which have up to now been used for the connection of the functional parts of operating rams, and which represent an enormous load on the environment, are no longer required. The time required for the manufacture of the joining connection is very short and depends upon the injection time for the plastic material and its hardening time. Overall the assembly time for the parts with the joining connection in accordance with the invention can be considerably reduced.

In a preferred embodiment one of the functional parts in each case comprises a filling or injection opening for the casting compound, which leads via an internal casting channel into the corresponding depression. This casting channel can in the simplest case consist of a drilling. Furthermore both wall sections preferably comprise a plurality of depressions. In this manner a plurality of cavities are created in the region of mutual overlap of both functional parts, which several cavities are formed to be separate from each other; in these cavities a locking body solidifies, as a result of which the force that can be accommodated by the joining connection increases. This is in particular necessary in the case of hydraulic operating rams, which form the preferred field of application of the invention, and which are designed for operating pressures of several hundred bar. Advantageously the depressions consist of circumferential corrugations, grooves, channels, or similar. These can in particular be aligned at right angles to the separating line between the functional parts. It is particularly beneficial if the corrugations, grooves, channels or similar comprise faces rising up to the wall section, where the faces are preferably angled at right angles to each other and/or the angle of inclination of the longer face to the wall section is 25° to 35°, in particular approximately 30°. With an angle of inclination for the longer face of the depression of approximately 30° the joining connection in accordance with the invention with the cast-in plastic has surprisingly demonstrated an optimum retention force. On the other hand the retention force that can be accommodated by the joining connection increases linearly with the number of channels, grooves or corrugations, and with the effective cross-section in the main loading direction parallel to the separating line.

Advantageously a distribution channel running at right angles to all the depressions is provided in the wall section of at least one of the parts, and the casting channel preferably opens out or leads into the distribution channel. This has the advantage that the wall sections of the two functional parts can be stacked inside each other, without a particular orientation between the two functional parts being necessary for an optimum distribution of the injected fluid plastic. The plastic material that is hardened or solidified in the distribution channel forms at the same time an additional safeguard against rotation between the parts that are connected together, and separate means of safeguarding against rotation, such as grub screws or pins, can be dispensed with.

In particular it is preferred if the corrugations, grooves, channels or similar are arranged in the wall sections of both parts such that the casting compound solidifies or hardens to rings with comparatively small cross-sections, preferably right-angled cross-sections. The rings can then be formed in the depressions, or in the cavity, in such a manner that the main diagonals of the cross-sections of the rigid rings are aligned with the main loading direction of a separating force between the functional parts produced by tensile or compressive forces. Here it is particularly advantageous if adjacent depressions are separated from each other by a web, where in the connected state the webs of the wall sections of the first and second parts are directly opposed to each other. In particular this also improves the sealing function of the joining connection in accordance with the invention, since the abutting webs in each case form a sealing gap, on both sides of which a solidified body of plastic material is located which undertakes the sealing function.

The joining connection in accordance with the invention offers the further advantage that for certain functional parts a guide sleeve or similar for an axially moving body in the interior of the functional part in question, or for the part in question itself can also be cast at the same time as the formation of the joining connection with the casting compound, while the depression of the wall section of this functional part leads via a feeder channel into an annular space. It shall be understood that for this suitable seals such as double lip seals or scrapers must be arranged on both sides of the annular space as necessary; these on the one hand prevent the casting compound from exiting the annular space, and on the other hand after hardening of the casting compound on the guide sleeve undertake sealing of the pressure chamber in the interior of the ram or similar. The sealing system for the guide sleeve can also be cast at the same time as the guide sleeve or cast previously.

In order to be able to manufacture the joining connection in a short period of time, it is particularly advantageous if the casting compound is an injection casting compound. For the preferred use of the method and the joining connection with hydraulic operating devices such as shield support props, hydraulic rams and advancing rams a casting compound of plastic is advantageously selected, which in the hardened or solidified state can withstand shear force loads of at least 20 N/mm$^2$, preferably at least 45 N/mm$^2$. The casting compound can be a thermoplastic, in particular a polyamide (PA) or a polyphenylether (PPE) or a polyterephtalate (PTP), in particular a polybutyleneterephtalate (PBT), or a polyvinylidenfluoride (PVDF). It is particularly advantageous if the casting compound is a fibre-reinforced casting compound, in particular a glass fibre-reinforced casting compound with, for example, approximately a 30% proportion of glass fibres.

The method and the joining connection can advantageously be used if the functional parts form the cylinder of a operating ram, and one of the parts consists of a cylinder tube section, and the other part consists of a cylinder cover. The cylinder cover can here be provided with an integral linkage eye, while the cylinder tube can particularly advantageously consist of a cold-drawn tube. By the use of cold-drawn tubes as the starting material it is possible to achieve material cost savings for the cylinders of up to 50% compared with hot-drawn tubes. The method and the joining connection can furthermore find advantageous application, if the functional parts form one stage of a multistage hydraulic ram, or if the first part consists of the cylinder of an operating ram and the second part consists of a sealing ring for the ram pressure chamber, centrally passed through by the piston rod. For this sealing ring it is then particularly favourable if the guide sleeve is also cast on or out at the same time as the joining connection. The piston of a hydraulic operating ram forms a further application for the method and the joining connection, where the first part can then consist of a piston rod and the second part consists of a piston ring circular in cross-section.

The joining connection in accordance with the invention offers furthermore the advantage of simple and fast maintenance, repair and renewal of the joining connection, the functional parts and or seals used, and similar, in that the wall sections of the parts connected together and the joining connection are heated up in a suitable manner, for example by inductive heating, to the temperature region, of up to approximately 300° C., of the plasticisation temperature of the plastic material used, in order to separate the joining connection and the functional parts when the plastic compound is plasticised or softened. The plastic material remaining in the depressions, the distribution channel and the casting channel can then be removed, for example, it can be peeled out or burnt out, and when the wall sections of the parts have been stacked inside each other once again a new joining connection in accordance with the invention can be manufactured using the injection casting method.

Further advantages and embodiments of the method in accordance with the invention and the joining connection in accordance with the invention are provided by the following description of various application possibilities for the joining connection in the hydraulic rams and shield support props for underground mining shown in the drawings. In the figures:

BRIEF DESCRIPTION OF THE DRAWINGS

FIG. 2 shows schematically a detail view of II in FIG. 1;

FIG. 3 shows schematically a detail view of III in FIG. 1;

DETAILED DESCRIPTION OF THE INVENTION

Figure 1:
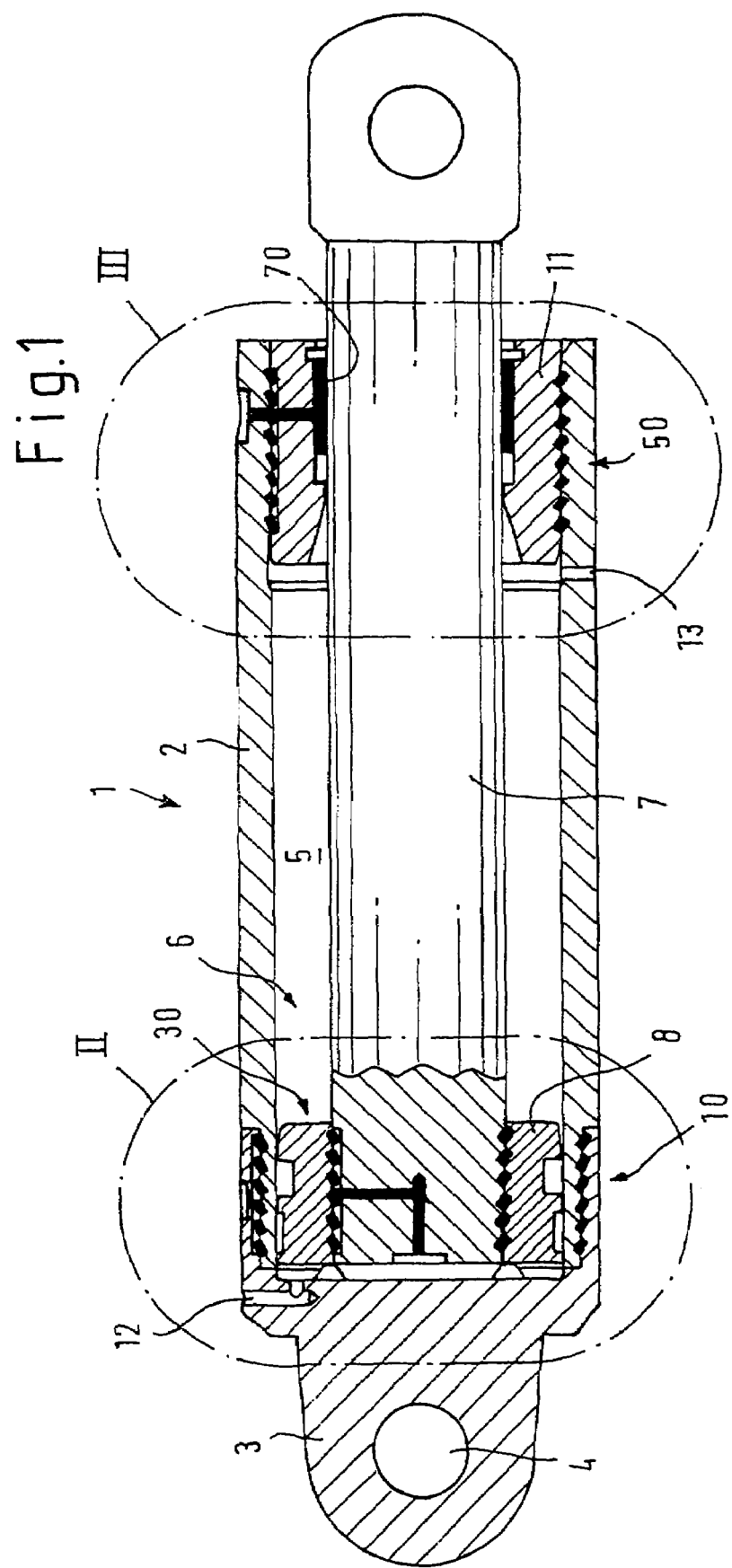
FIG. 1 shows a longitudinal section through a hydraulic ram with in total three joining connections in accordance with the invention, on the cylinder casing, on the sealing ring of the cylinder volume, and between piston and piston rod.

The hydraulic ram that is designated in total by 1 in FIG. 1 can e.g. be used as an advancing ram for shield advance, in order to advance a conveyor or an extraction machine in the direction of an excavation face and then by retracting the hydraulic ram, which can be activated in two directions, to move forward an shield support. The hydraulic ram 1 comprises an outer cylinder tube 2, which at the left-hand end in FIG. 1 is connected and at the same time sealed with a cylinder cover 3 by means of a first joining connection in accordance with the invention, denoted in total by 10, made of solidified plastic casting compound. On the cylinder cover 3 is integrally formed a linkage eye 4 for the jointed connection of the ram 1 to a support such as a bearing block. In the internal volume 5 of the hydraulic ram 1 a piston 6 is guided such that it can be moved; it consists of a piston rod 7 and an annular piston body 8, which are securely and in a sealed manner connected together by means of a second joining connection 30 in accordance with the invention of solidified plastic cast material. At the right-hand, forward end in FIG. 1 of the hydraulic ram 1 the piston rod 7 is guided within a sealing ring 11, which seals off the pressure chamber 5 at this end of the cylinder, and which is connected securely and in a sealed manner with the internal wall of the outer cylinder tube 2 via a third joining connection 50 consisting of solidified plastic cast material. Both sides of the piston body 8 of the piston 6 can be loaded with the operating pressure; to push out the piston rod 7 a hydraulic fluid flows into the left-hand swept volume of the cylinder via the drilling 12, and to retract the ram the swept volume 5 at the rear of the piston body 8, as represented, is loaded by the hydraulic fluid via the drilling 13. The operating pressure of the hydraulic fluid in the swept volume in question can here reach several hundred bar, as is known art and required for hydraulic rams that are appropriately used in mining.

The invention on the hydraulic ram 1 consists in particular of the joining connections 10, 30 and 50, which in FIG. 1 are represented as a black body mass in the hardened or solidified state, whereas these are not represented in the detail drawings shown in FIGS. 2 to 5. These Figs. show only the cavities into which the plasticised fluid casting compound of suitable plastic material flows. This is now explained in more detail with reference to FIGS. 2 to 5.

FIG. 2 shows in detail the joining connection 10 between the outer cylinder tube 2 and the cylinder cover 3, as well as the joining connection 30 between the shaft end of the piston shaft 7 and the piston body 8. The outer cylinder tube 2 consisting of a cold-drawn metal tube comprises at its end face a shoulder with an annular extension 14, whose outer wall section 14' is provided here with a total of six adjacently axially arranged concentric grooves 16 forming depressions. In the orientation of the connection as shown the outer wall section 14' of the extension 14 is overlapped by an integral extension 15 of the cylinder cover 3, on the inner wall 15' of which a series of here six grooves 17 is formed. The extensions 14,15 with the wall sections 14',15' can be pushed into each other with a small clearance (clearance fit or transition fit) and the grooves 16,17 consist of faces angled at right angles to each other; with the extensions pushed into each other these create cavities of right-angled cross-section, into which a suitable plastic material such as a polyamide (not shown) reinforced with 30% glass fibres can be injected in a plasticised fluid state at high pressure via the injection opening 18 in the extension 15 of the cylinder cover 3, to manufacture the joining connection 10. The distribution of the fluidised plastic material into the individual cavities or grooves of right-angled cross-section takes place via the distribution channel 19, which is schematically indicated directly underneath the injection opening 18 and is connected to the latter via the casting channel 26; the distribution channel extends in the axial direction over the total width of the region of the wall sections 14', 15' that is provided with the grooves 16, 17. The ends 20, 21 of the extensions 14, 15 each butt onto a shoulder of the cylinder 2 or of the cylinder cover 3, in order to close off the cavities on both sides in the axial direction and to retain the plastic casting compound injected into the cavities at a high pressure of, for example, 300 bar and temperatures of approximately 300° C. After the solidification or hardening of the plastic material the cylinder cover 3 and the cylinder 2 are connected together by means of a positive form fit by reason of the hardened rings (FIG. 1) of plastic material filling the depressions 16, 17; at the same time the rings bring about a sealing of the separating gap between the two parts 2, 3. The plastic material is preferably selected such that in the solidified state it can accommodate tensile loads of approximately 50 N/mm². Suitable materials are for example the polyamide STANYL® or the polybutyleneterephtalate ARNITE® from the DSM company, in each case reinforced with 30% glass fibres. With a number of six or more rings and their arrangement in a manner such that the individual rings are loaded along their widest diagonal by the compressive forces between the parts 2, 3, the joining connection 10 can be acted upon by hydraulic pressures in the swept volume of over 300 bar, without the parts 2, 3 being separated from each other, or leakages appearing between them.

Figure 4:
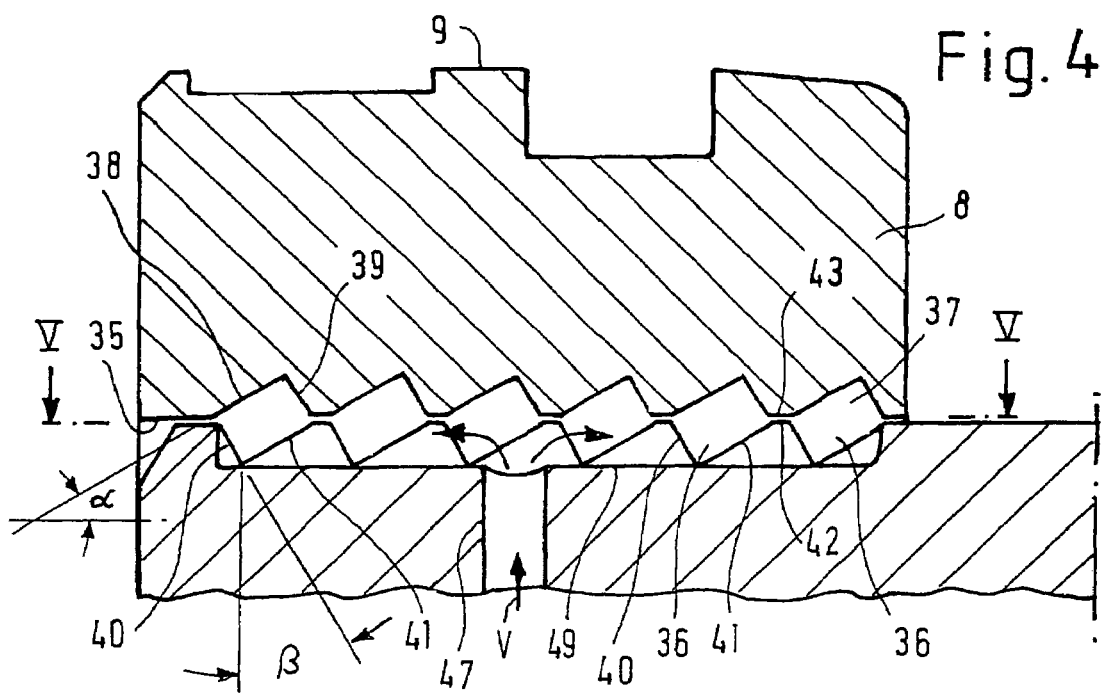
FIG. 4 shows schematically in section a detail view of IV in FIG. 2 with the cavity between piston ring and piston rod.
Figure 5:
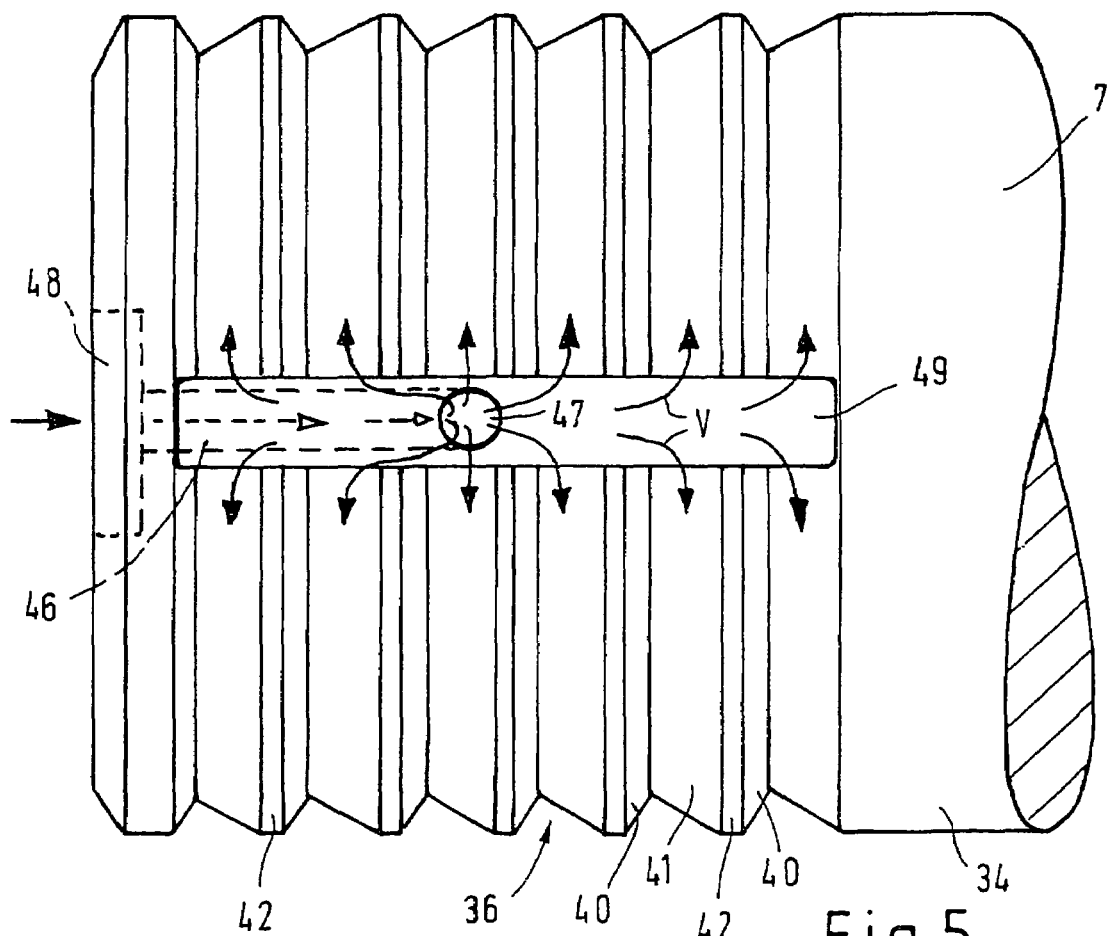
FIG. 5 shows schematically a view along V-V in FIG. 4.

FIGS. 2, 4 and 5 show as a further embodiment example the joining connection 30 for a rigid and sealed attachment of the piston body 8 to one end of the piston rod 7. The annular piston body 8, the outer wall 9 of which can slide in a sealed manner along the inner wall of the cylinder 2 (FIG. 2), is provided here with six grooved depressions 37 on its annular inner wall 35, each of which exhibits faces angled at right-angles to one another 38, 39, as can be seen clearly in FIG. 4, in order to create pressure chambers on either side of the piston body 8. In the assembled state shown, in which the piston rod 7 and the piston body 8 are connected together, depressions 36 lie opposite to the grooved depressions 37 in the piston body 8; these depressions 36 are formed in the outer wall 34 of the piston rod 7, and similarly include faces angled at right-angles to one another 40, 41. The outer diameter of the wall section 34 of the piston rod 7 is smaller than the inner diameter of the inner wall section 35 of the piston body 8, by a clearance fit or transition fit, so that piston body 8 and piston rod 7 can be mated together. Between the faces 40, 41 of adjacent grooves 36 are formed cylindrical webs 42, and between the faces 38, 39 of adjacent grooves 37 are formed cylindrical webs 43, of a few mm axial length, which in the assembled state lie directly opposed to each other, and which separate completely, or as completely as possible, the cavities formed by each of the depressions 36, 37. The angle of inclination α of the longer face 38 or 41 of the depressions 37,36 in each case is, relative to the wall sections 35 or 34, approximately 30°, and the angle of inclination β of the shorter faces 39 or 40 perpendicular to the wall sections 34,35 is correspondingly 60°. The axial length of the cylindrical webs 42,43 is significantly shorter than the axial length of the depressions 36, 37 and can e.g. be of the order of 4 mm. For the injection of the plastic material an injection opening 48 (FIG. 2) is fitted to the front face of the piston rod 7, which via two casting channels 46 and 47 consisting of drillings opens out into a distribution channel 49, which extends in the axial direction of the piston rod 7 over all the depressions 36. In this manner the fluid plastic material, as indicated by the arrows V in FIGS. 4 and 5, can distribute through the distribution channel 49 via the individual cavities, and can fill completely the cavities or depressions 36,37 in the two functional parts 7,8 that are to be connected together. The plastic material solidifies in the depressions 36,37 into rings, which fill them, and which connect together the two parts 7,8 by means of a positive form fit and at the same time seal completely the separating gap between the wall sections 34 and 35.

FIG. 3 shows a third application example of a joining connection 50 in accordance with the invention to connect the cylinder 2 with the sealing ring 11, which at the same time on its inner face with a guide sleeve (70, FIG. 1) forms a guide for the piston rod 7. The joining connection 50 consists here of a total of eight depressions 56 or 57 arranged one behind the other in the axial direction on the cylindrical inner wall section 55 of the cylinder 2, and on the cylindrical outer wall section 54 of the sealing ring 11 respectively; the geometry of the depressions 56,57 corresponds to the geometry of the depressions in the previous embodiment examples. The plastic material, with which the positive form fit in the joining connection 50 is manufactured, can be introduced via the injection opening 58 and the casting channel 66 in the cylinder 2 as well as via a distribution channel 59, which here is arranged in the outer wall section 54 of the sealing ring 11, into the individual depressions or grooves 56,57. The positioning of the distribution channel 59 takes place preferably in such a way that the casting channel 66 opens out directly into the distribution channel 59, in order to achieve an optimum distribution and introduction of the plastic material into the cavity and all the depressions 56,57. In the embodiment example in FIG. 3 a guide sleeve 70 (FIG. 1) for the piston rod 7 is formed at the same time with the injected plastic material. For this purpose an annular volume 71 is turned out of the inner wall of the sealing ring 11, into which opens out a feeder channel 72 running from the floor of the distribution channel 59 and preferably consisting of a drilling. The annular volume 71 is bounded on either side by volumes 73 and 74 for the accommodation of sealing elements, which prevent, at least during casting of material in the annual volume 71, any lateral escape of plastic material out of the annular volume 71. The corresponding seals can be removed after the hardening of the plastic material in the annular volume 71 into a guide sleeve 70 (FIG. 1) for the piston rod 7, and the sealing between the piston rod 7 and the sealing ring 11 then takes place exclusively via the clearance seal between the piston rod 7 and the guide sleeve 70, or in one or both ancillary volumes 73, 74 suitable seals or scrapers are arranged, which in long-term operation of the hydraulic ram 1 provide the sealing. The casting of the joining connection 50 with simultaneous formation of the guide sleeve 70 takes place preferably with the piston rod 7 already in place. This can be provided on part of its outer surface with a non-stick medium or similar, in order to prevent adhesion of the injected plastic material to the piston rod 7.

For the manufacture of each of the joining connections 10, 30, 50 and the guide sleeve 70 a suitable material is used; this is in its plasticised state a castable and fluid plastic, in particular a suitable injection casting material such as a glass fibre-reinforced polyamide or a glass fibre-reinforced polybutylenterephtalate, which after hardening exhibits the required mechanical stability. The plastic material is plasticised at temperatures of up to approximately 300° and is then injected in the fluid state via each of the injection openings 18, 48 and 58 into the cavities provided in accordance with the invention, which relative to the separating gap include undercuts in both parts that are to be connected together. The filling volume of each of the cavities is known and the injection casting compound is metered as it is injected at a high pressure of over 200 bar. Because of the relatively long and narrow flow paths the injection process can require a certain period of time, so that it is advantageous to pre-heat the metal parts that are to be connected together, such as for example the piston rod 7 and the piston body 8, or the cylinder cover 3 and the cylinder 2, to temperatures of 100° or higher before the injection of the plastic material. As soon as the injected plastic mass is hardened, the parts can be used. The total assembly time is short and the assembly can be performed in a fully automated manner.

Figure 6:
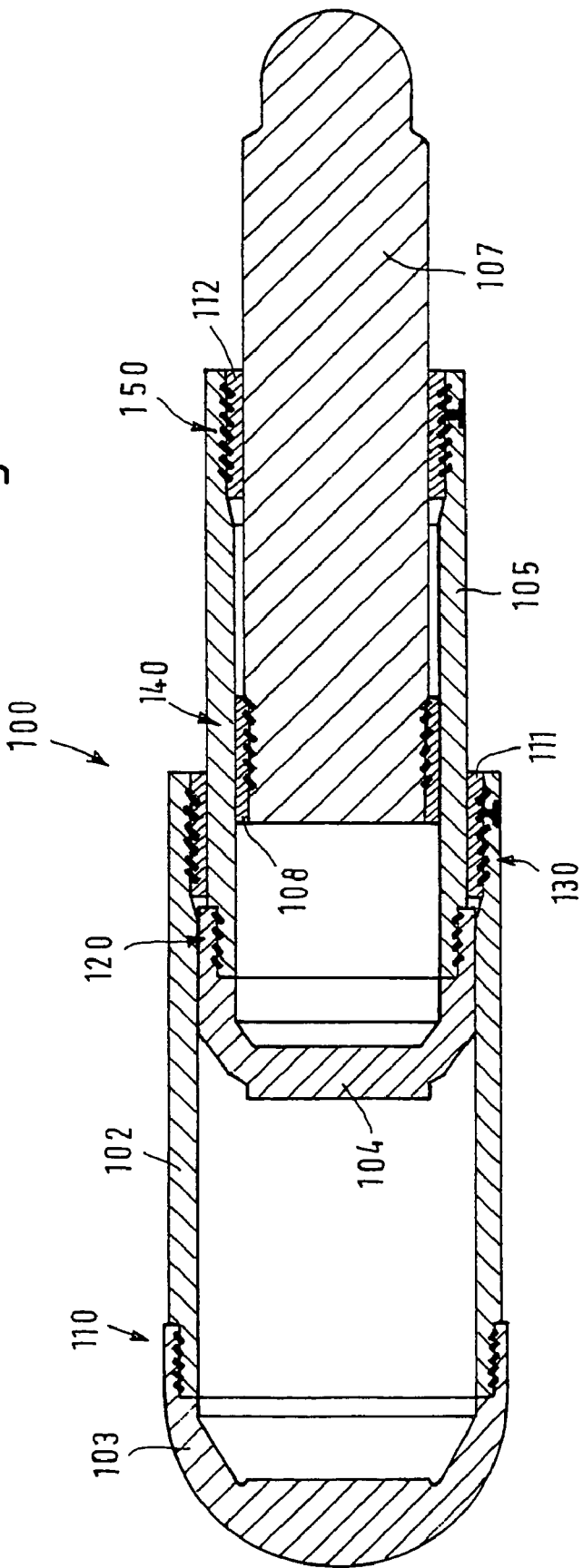
FIG. 6 shows schematically a section through a telescopic shield support prop, whose parts are connected together with the joining connection in accordance with the invention.

FIG. 6 shows in a further embodiment example, how with the joining connection in accordance with the invention the functional parts of a telescopic hydraulic ram 100 can be connected together, which e.g. can be used as a roof prop or shield support prop to provide overhead support in underground mining. In the embodiment example shown the individual parts of the extension ram 100 with a total of five joining connections 110, 120, 130, 140 and 150 in accordance with the invention are connected together; all joining connections, as explained further above, consist of injected plastic material, which is injected into a cavity between the parts to be connected, completely fills the cavity and hardens, in order to connect together the parts by means of a positive form fit and at the same time to seal the joint. The joining connection 110 connects the cylinder cover 103 with the outer cylinder 102 of the first stage of the ram. The joining connection 120 connects the cylinder cover 104 with the outer cylinder 105 of the second stage of the ram. The cylinder tube 105 is guided such that it can move in a sealing ring 111, which by means of the joining connection 130 of cast-in plastic is secured on the inner periphery of the outer cylinder 102. The cylinder cover 104 forms at the same time the piston head for the second stage. In the interior of the cylinder 105 the piston rod 107 is arranged such that it can move axially; onto the piston rod 107 at the left-hand end of FIG. 6 a piston ring 108, here relatively thin-walled, is secured with a further joining connection 140 in accordance with the invention. The piston rod 107 is guided at the same time in a second sealing ring 112, which is secured to the inner wall of the cylinder 105 by means of the fifth joining connection 150. All parts can be connected together within a very short period of time and the geometry of the cavities for the joining connections 110, 120, 130, 140 and 150 corresponds to that of the previous embodiment examples.

For the specialist a series of modifications can be envisaged from the previous description, which should fall within the scope of protection of the attached claims. The number of depressions or grooves in the mutually overlapping wall sections of the parts that are to be connected together correlates with the material properties of the plastic material used. The higher the tensile strength in the hardened state, the lower can be the number of grooves. A minimum number of, for example, six grooves offers advantages, however, both with regard to the strength of the joining connection to be achieved, and also with regard to the sealing effect between the parts. The geometry of the grooves or depressions and the geometry of the bodies made of plastic material that are created at the end of the hardening process can vary, and the specialist shall understand that the process parameters, in particular the plasticisation temperature, the injection temperature, the pre-heating temperature of the parts and the injection pressure can be adapted to the material used as well as the geometry and the volume of each of the cavities. The two parts to be connected together can also exhibit threaded sections that are matched to each other, with which they are screwed together in a first assembly step, before the plastic is cast into the cavity. For disassembly of the parts it is only necessary to plasticise the joining connection by sufficient heating of the mutually overlapping wall sections. After the removal of all plastic material from the depressions the parts can be connected together again.

The description of the invention is made with reference to cylindrical parts of hydraulic rams. The invention can however also be used with pneumatic rams or with other parts that are to be connected together, in particular if with these parts a sealing of the separating gap is to be achieved at the same time as the connection.

The invention claimed is:

1. A joining connection for functional parts of hydraulic or pneumatic operating devices, the joining connection comprising a first part of a hydraulic or pneumatic operating device having an outer wall section and a second part of a hydraulic or pneumatic operating device having an inner wall section, which parts can be joined together and connected to each other with mutually overlapping wall sections, with the sections are overlapping with a transition fit or a clearance fit, wherein both wall sections comprise a depression, which in the connected state form a cavity being filled with a casting compound of plastic, which is plasticised and fluid by means of heating, and which after its hardening or solidification withstands shear force loads of at least 20 N/mm$^2$ and connects the two parts to each other by means of a positive form fit, and wherein one of the parts comprises a filling or injection opening for the casting compound, which opening leads via a casting channel into the corresponding depression.

2. The joining connection in accordance with claim 1, wherein both wall sections comprise a plurality of depressions.

3. The joining connection in accordance with claim 2, wherein the depressions comprise circumferential corrugations, grooves or channels, which are aligned at right-angles to a separating line between the parts.

4. The joining connection in accordance with claim 3, wherein the corrugations, grooves or channels have faces rising up from the wall section.

5. The joining connection in accordance with claim 4, wherein adjacent faces are angled at right-angles to each other.

6. The joining connection in accordance with claim 4, wherein an angle of inclination of longer ones of the faces to the wall section is 25° to 35°.

7. The joining connection in accordance with claim 3, wherein the joining connection for the maintenance of the functional parts of the operating device may be separated by means of heating and therewith plasticisation of the plastic material of the joining connection.

8. The joining connection in accordance with claim 2, wherein the corrugations, grooves or channels are arranged in the wall sections of both parts such that the casting compound solidifies or hardens to form rings with right-angled cross-sections.

9. The joining connection in accordance with claim 8, wherein the joining connection for the maintenance of the functional parts of the operating device may be separated by means of heating and therewith plasticisation of the plastic material of the joining connection.

10. The joining connection in accordance with claim 2, wherein adjacent depressions in the wall sections are separated from each other by a web, and in the assembled state the webs of the wall sections of the first and second parts lie directly opposed to each other.

11. The joining connection in accordance with claim 1, wherein the depression of the wall section of one of the parts leads into a feeder channel to an annular space, adapted to be filled with the casting compound in order to cast a guide sleeve for a body that is axially movable in the interior of said one of the parts or for said one of the parts itself.

12. The joining connection in accordance with claim 1, wherein the casting compound of plastic in the hardened or solidified state withstands shear force loads of at least 45 N/mm$^2$.

13. The joining connection in accordance with claim 1, wherein the casting compound is a polyamide, polyphenylether, or polyterephtalate thermoplastic selected from the group consisting of a polybutyleneterephtalate and a polyvinylidenfluoride.

14. The joining connection in accordance with claim 1, wherein the casting compound is a glass fibre-reinforced casting compound.

15. The joining connection in accordance with claim 1, wherein the joining connection for the maintenance of the functional parts of the operating device may be separated by means of heating and therewith plasticisation of the plastic material of the joining connection.

* * * * *